US005340970A

United States Patent [19]

Wolfe, Jr. et al.

[11] Patent Number: 5,340,970

[45] Date of Patent: Aug. 23, 1994

[54] ARTICLE CHECKOUT SYSTEM WITH SECURITY PARAMETER OVERRIDE CAPACITY

[75] Inventors: Donald M. Wolfe, Jr., Coral Springs; John C. Allard, Boca Raton; Cuong H. Nguyen, Coral Springs; Larry E. Axsom, Boca Raton; Jerry D. Gabbard, Deerfield Beach, all of Fla.

[73] Assignee: CheckRobot Inc., Deerfield Beach, Fla.

[21] Appl. No.: 852,569

[22] Filed: Mar. 17, 1992

[51] Int. Cl.[5] .......................... G06K 15/00; A63F 9/02

[52] U.S. Cl. ........................................ 235/383; 186/61

[58] Field of Search .................. 235/381, 383; 186/61, 186/55; 364/478; 177/50, 25.15

[56] References Cited

U.S. PATENT DOCUMENTS

| | | | |
|---|---|---|---|
| 4,787,467 | 11/1988 | Johnson | 235/383 |
| 4,792,018 | 12/1988 | Humble et al. | 235/383 |
| 5,115,888 | 5/1992 | Schneider | 186/61 |

*Primary Examiner*—John Shepperd

*Assistant Examiner*—Jeffrey R. Filipek

*Attorney, Agent, or Firm*—Robin, Blecker, Daley & Driscoll

[57] ABSTRACT

A system of the so-called "operator-unassisted" type, for processing articles selected for purchase and bearing an identification code, includes a code reader generating output signals indicative of the article identification codes, a sensor generating output signals indicative of measurable characteristics of the articles, a memory for storage, for each of the articles, of a signal indicative of the measurable characteristic thereof correlated with the article identification code, an article rejector for rejecting the selection of an article for purchase on failure of correspondence of the sensor output signal and the corresponding stored measurable characteristic signal and a control unit operable selectively on such rejection of the article purchase selection for substituting the output signal generated by the sensor for the stored measurable characteristic signal. The control unit effectively introduces an "override capacity" to heretofore known systems.

6 Claims, 3 Drawing Sheets

ARTICLE CHECKOUT SYSTEM WITH SECURITY PARAMETER OVERRIDE CAPACITY

FIELD OF THE INVENTION

This invention relates generally to systems for the checkout of articles selected for purchase and pertains more particularly to so-called "operator-unattended" article checkout systems.

BACKGROUND OF THE INVENTION

U.S. Pat. Nos. 4,676,343 and 4,792,018, commonly-assigned herewith, set forth systems for operator-unattended checkout with particular concern for detection of customer fraud and deterrence of the same.

In the '343 patent, an article selected for purchase has its universal product code (UPC) scanned by a code reader and the code reader output signals effect the fetching from storage of a signal indicative of a measurable characteristic of the article. The article is placed on a conveyor and led thereby into a security zone defined by inlet and outlet light curtains. In the security zone, the measurable characteristic of the selected article is measured by a sensor and the sensor provides an output signal indicative of the measurement. A comparison is made of the sensor output signal and the fetched signal and, if the comparison is favorable, the conveyor continues to move in an article acceptance sense. Should the comparison be negative, the movement of the conveyor is reversed and the article placed on the conveyor is returned to the customer.

The system thus detects and rejects customer fraud in substituting a more expensive article having diverse characteristics from those of the article scanned for UPC. Beyond the described anti-fraud facility, conveyor movement is reversed on violations of the security zone, as by efforts of a customer to reach into the security zone to substitute articles.

In the '018 patent, various security-related improvements are disclosed, one of which is the reconfiguration of the inlet light curtain to sense the size of a selected article in addition to the role of the curtain in guarding the security zone from fraudulent customer interaction. While the '343 patent contemplates article size also as a measurable article characteristic, the '018 patent discloses the capacity for providing the measured article size information store itself from the inlet light curtain. Thus, as an article is introduced into the security system, its size, as indicated in signals provided from measurement by the inlet light curtain, is storable in the system data base for security purposes. The same may be said of the weight scale in the security zone, i.e., the systems of the commonly-assigned patents may look to weight or size as the measured article characteristic, or jointly to both such security parameters.

While the commonly-assigned patents describe their systems as operator-unattended, practical implementation thereof has led to a re-characterization thereof as systems requiring limited operator assistance, vastly less than the conventional, fully operator-attended systems theretofore known. Typically, an employee is assigned to a prescribed number of checkout counters and floats therebetween as assistance is required.

One basis for the need for some operator assistance derives from article supplier activity not keyed into the security data base by the manager of the facility using the system, typically a food market supermarket. By way of example, in a promotional effort for a given article, a further article may be affixed thereto as an award for purchase of the article. This gives rise to a size characteristic which compares negatively with the stored size characteristic for the article absent its companion.

Heightened operator assistance attends the described situation, since all article rejections by the checkout system require an operator to assist in the checkout, e.g., as in bypassing the system for the rejected article. While the above example is a size discrepancy, article suppliers will at times change the weight aspect of an article, e.g., by changing a container from plastic to glass or vice versa. Weight discrepancy likewise gives rise to article rejection and need for operator assistance.

The efficacy of usage of the checkout systems of the commonly-assigned patents manifestly correlates with minimizing of operator assistance. In the described deficiencies attending security system parameters, efficacy is depleted in that operator assistance is called for repetitively and time-consumingly for each instance of the deficiency, which will occur continuously until such time as the data base is updated.

SUMMARY OF THE INVENTION

The present invention has as its primary object the provision of improved systems of so-called operator-unattended variety.

A more particular object of the invention is to provide for enhanced efficacy of the described systems, specifically in lessening need for operator assistance thereto.

In attaining the foregoing and other objects, the invention provides a system for processing articles selected for purchase and bearing an identification code, comprising a code reader generating output signals indicative of the article identification codes, a sensor generating output signals indicative of measurable characteristics of the articles, a memory for storage, for each of the articles, of a signal indicative of the measurable characteristic thereof correlated with the article identification code, an article rejector for rejecting the selection of an article for purchase on failure of correspondence of the sensing means output signal and the corresponding stored measurable characteristic signal and a control unit operable selectively on such rejection of the article purchase selection for substituting the output signal generated by the sensor for the stored measurable characteristic signal. The control unit effectively introduces an "override capacity" to heretofore known systems.

By its configuration, on the occurrence of noncorrespondence of the compared values enabling article acceptance giving rise to unwarranted article rejection, the system permits an operator to correct matters through a single use of the override capacity. Suitable measures, i.e., operator authorization code input, may be taken to insure that the override is indeed authorized. As will be understood, once the override is effected, article rejection will not occur again, since the security system data base has been updated. The measurable article characteristic can be article size, article weight, or both of such characteristics.

The foregoing and other objects and features of the invention will be further understood from the following detailed description of preferred embodiments and practices thereof and from the drawings, wherein like reference numerals identify like components throughout.

DETAILED DESCRIPTION OF PREFERRED EMBODIMENTS AND PRACTICES

Incorporating reference is hereby made to the aforementioned commonly-assigned patents, i.e., U.S Pat. Nos. 4,676,343 and 4,792,018.

Figure 1:
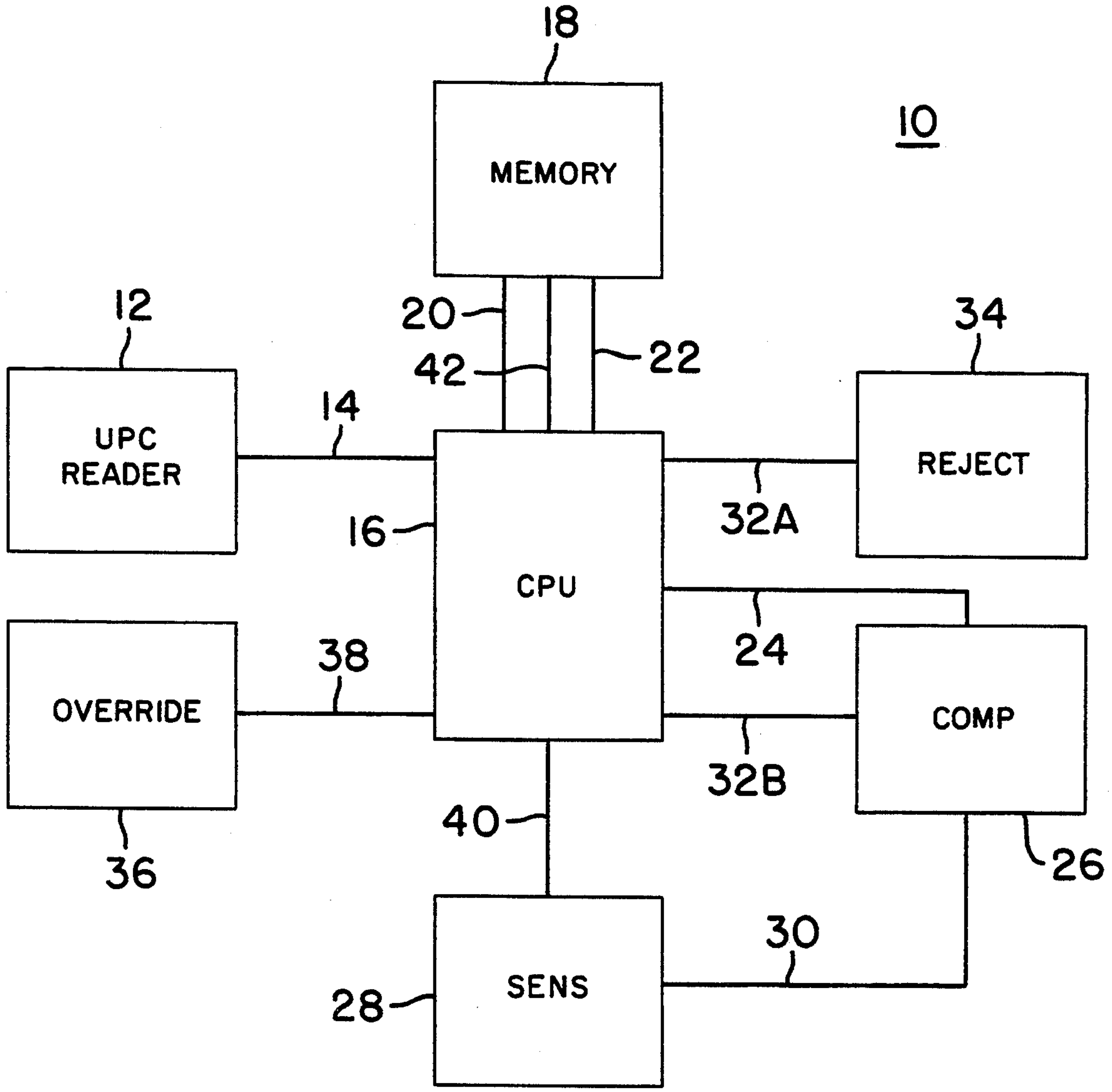
FIG. 1 is a block diagram of a checkout system in accordance with the invention.

Referring to FIG. 1, checkout system 10 is adapted for the processing of articles selected for purchase and bearing an identification code, typically the well-known universal product code (UPC).

System 10 includes UPC reader 12, which may be a known scanner for the reading of article UPC and generating output signals indicative of the article UPC on line 14.

A central processor (CPU) 16 is provided for implementing the program discussed below in connection with the flowchart of FIGS. 2*a* and 2*b* and receives the line 14 signal as an input.

CPU 16 has further connection with memory 18 over lines 20 and 22. Memory 18 provides therin storage, for each of the system articles, a signal indicative of a measurable characteristic thereof correlated with the article identification code.

By a fetch signal on line 20 to memory 18, CPU 16 is responsive to receipt of each of the UPC reader output signals on line 14 to fetch from memory 18 on return line 22 the stored signal indicative of the measurable characteristic correlated with the article identification code. The fetched measurable characteristic signal is furnished by CPU 16 over line 24 to comparator (COMP) 26.

Selected article measurable characteristic sensor (SENS) 28 furnishes a signal over line 30 to comparator 26, the signal being indicative of the measured article characteristic.

By a signal provided on line 32A, responsively to comparison failute indicated by comparator 26 on line 32B, CPU 16 informs selection rejector (REJECT) 34 of the need to reject the present sale, e.g., of the need to reverse conveyor movement and return the article to the customer. Where the comparison of stored and measured article characteristic is affirmative, CPU 16 does not provide such rejection output on line 32 A and progress is to the next selected article.

Where the rejection at hand is attributable to the aforementioned article characteristic change in connection with a promotional event or the like, system 10 includes facility for adapting the self-checkout system to but a single operator assist in connection with the aberration. To this end, system 10 includes override unit 36, which is operator-enabled to provide output indication on line 38 to CPU 16. On receipt of such override indication, CPU 16 is operable to accept the current output of sensor 28, as provided thereto on line 40, and to store the same in memory 18 over line 42 in substitution for the current, inapplicable measurable article characteristic, in correlation with the current UPC indication on line 20.

Given such corrective input to system 10, it will be appreciated that, on the next processing of the aberrative article, no need arises for operator intervention, since affirmative output will result from comparator 26, its input signals, fetched and measured, being equal in article characteristic indication.

Figure 2A:
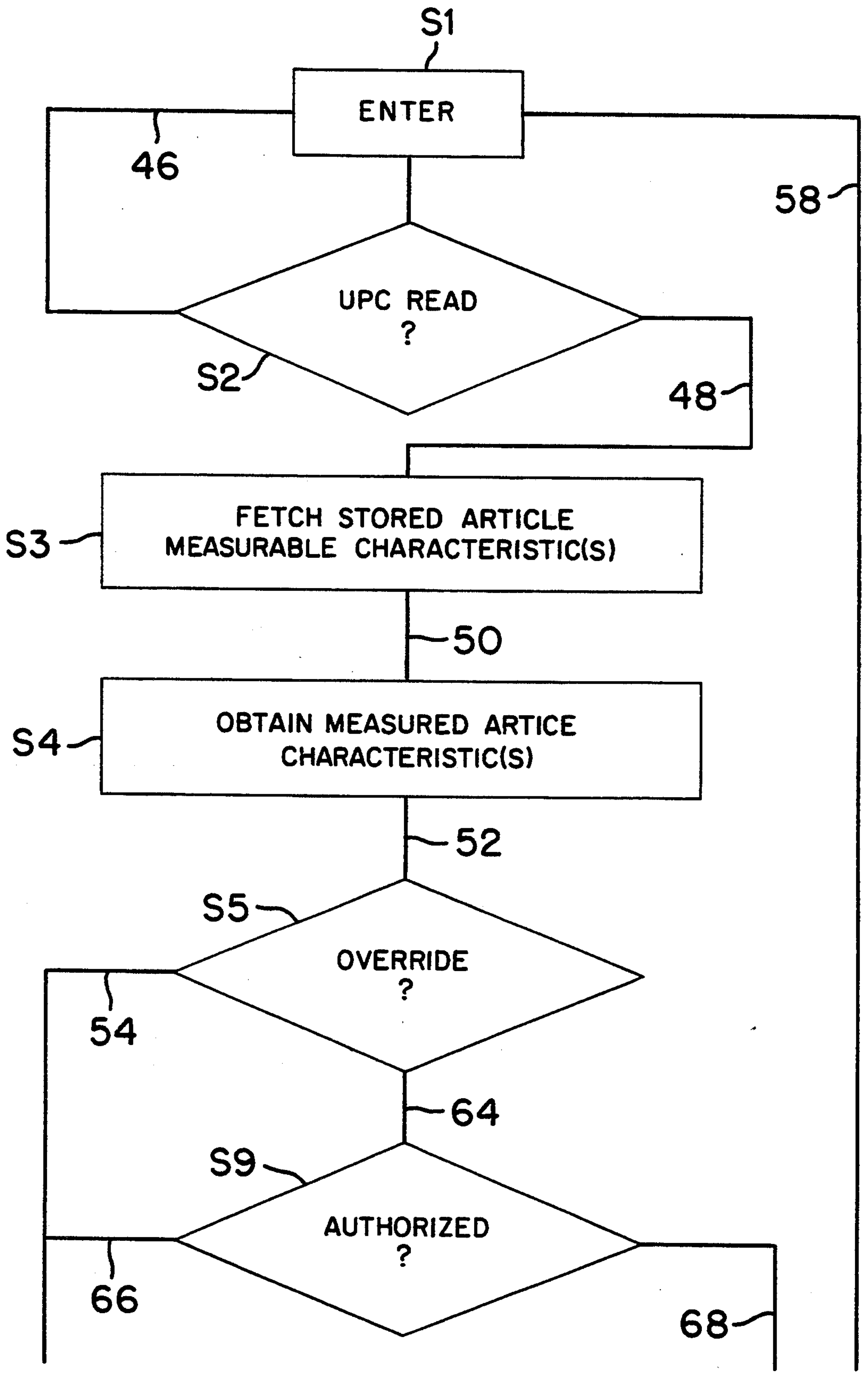
FIGS. 2*a* and 2*b* depict a flow chart of a program implemented by the CPU of FIG. 1.
Figure 2B:
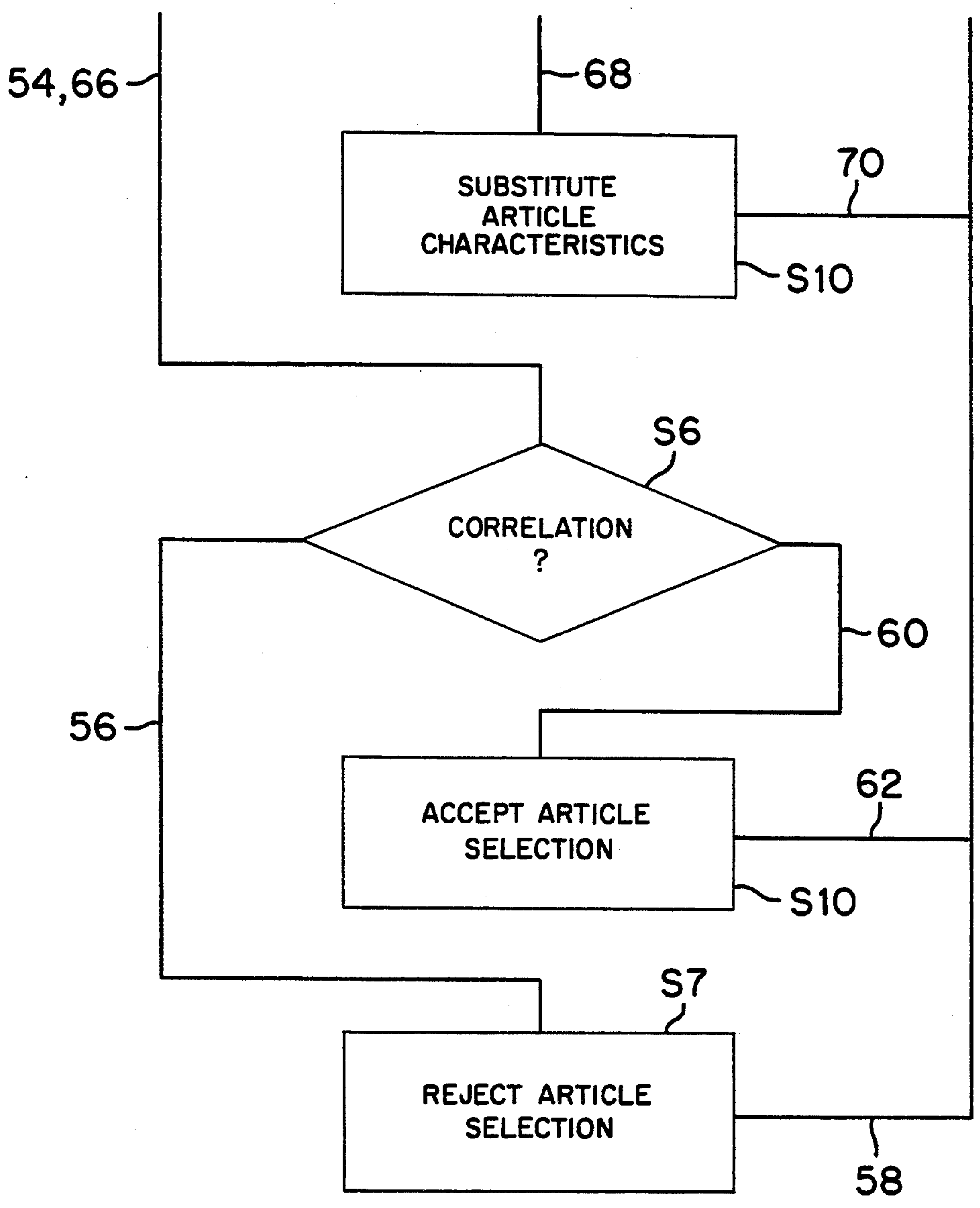

Turning now to FIGS. 2*a* and 2*b*, a flowchart for operation of CPU 16 is reached through ENTER step S1 and proceeds therefrom to step S2—? UPC READ—. If the article identification code has not been read, the program cycles through line 46. On the other hand, if the article identification has been read, progress is over line 48 to step S3—FETCH STORED ARTICLE MEASUREABLE CHARACTERISTIC(S)—, which may be weight, size or both such characterictics. Progress is over line 50 to step S4—OBTAIN MEASURED ARTICLE CHARACTERISTIC(S).

The program next proceeds over line 52 to step S5—? OVERRIDE—. If the step S5 inquiry is answered in the negative, progress is over line 54 to step S6—? CORRELATION—. If correlation is not found in step S6, progress is over line 56 to step S7—REJECT ARTICLE SELECTION—and thence over line 58 to step S1.

If correlation is found, progress is over line 60 to step S8—ACCEPT ARTICLE SELECTION—and thence over line 62 to step S1.

If the answer to the step S5 inquiry is in the affirmative, progress is over line 64 to step S9—? AUTHORIZED—, wherein CPU 16 looks to whether an authorized operator has entered a code number or the like to override the system. If the answer to the inquiry of step S9 is negative, progress is over line 66 to step S6, with above discussed results.

If the answer to the step S9 inquiry is in the affirmative, progress is over line 68 to step S10—SUBSTITUTE ARTICLE CHARACTERISTIC(S)—and progress is thence over line 70 to step S1.

Methods in accordance with the invention encompass, in broad aspect, a method for the checkout of articles selected for purchase and bearing a readable identification code, comprising the steps of providing a store of signals indicative of article measurable characteristics cross-correlated with article identification codes, reading the identification code for an article selected for purchase and consulting the store for measurable characteristics and providing article measurable characteristic indication from the store, measuring a characteristic of an article selected for purchase, comparing the measured characteristic of an article selected for purchase with the article measurable characteristic indication from said store, and permitting, on failure of performance of the comparison, operator input of article measured characteristic to the store in substitution for the stored article measurable characteristic indication theretofore contained therein.

While the systems and methods of the invention have been characterized as being responsive to article rejection, e.g., conveyor reversal, other indication to the operator of failure of correlation is contemplated, and the subsequent responsivity of the systems and methods to override input, it need be appreciated that the invention contemplates situations wherein an operator may enter corrective article measurable characteristics afresh, i.e., without prior article rejection for lack of correlation. Thus, as noted in the second of the incorporated and commonly-assigned patents, the article characteristic measurement store may be compiled from the article characteristic measurement sensor, and such measurement store may be amended at any time by operator override input. Specifically, the invention contemplates situations where an operator, knowing of an article measurable characteristic change at the outset of a given day may simply approach the system at hand and generate an override to input the sensor output into the store in substitution for its prior contents, without there having been an article rejection. This practice avoids even the initial article rejection for lack of correlation.

The methods of the invention, as noted, may include the further step of conditioning practice of the substitutive step on operator input of a predetermined access signal.

Various changes in structure to the described checkout system and modifications in use thereof may evidently be introduced without departing from the invention. Accordingly, it is to be understood that the particularly disclosed and depicted embodiments are intended in an illustrative and not in a limiting sense. The true spirit and scope of the invention is set forth in the following claims.

What is claimed is:

1. A system for processing articles selected for purchase and bearing an identification code, comprising:

(a) code reader means for generating output signals indicative of said article identification codes;

(b) sensing means for generating output signals indicative of measurable characteristics of said articles;

(c) storage means for storage, for each type of article, a signal indicative of a standard or predetermined characteristic thereof correlated with the article identification code;

(d) article rejection means for rejecting the selection of an article for purchase on failure of correspondence of one of said sensing means output signals and the corresponding stored characteristic signal; and (e) control means operable selectively on such rejection of said article purchase selection for substituting the one output signal generated by said sensing means for the stored characteristic signal.

2. The invention claimed in claim 1 wherein said sensing means generates said output signals thereof as indicative of article size.

3. The invention claimed in claim 1 wherein said sensing means generates said output signals thereof as indicative of article weight.

4. A system for processing articles selected for purchase and bearing an identification code, comprising:

(a) code reader means for generating output signals indicative of said article identification codes;

(b) sensing means for generating output signals indicative of measurable characteristics of said articles;

(c) storage means for storage, for each type of article, a signal indicative of a standard or predetermined characteristic thereof correlated with the article identification code;

(d) processor means for receiving said code reader means output signals and said sensing means output signals and connected to said storage means, said processor means being responsive to receipt of each said code reader means output signal to fetch from said storage means the stored signal indicative of the characteristic correlated with the article identification code indicated in said code reader means output signal;

(e) comparator means for receiving one of said sensing means output signals and one of said stored signals fetched by said processor means, for comparing the indications therein of article characteristics and for providing output signals indicative of the result of such comparison;

(f) rejection means for receiving said output signals of said comparator means for rejecting the selection of said article for purchase where said comparison result is negative and providing an output signal indicative of said rejection; and (g) override means operative selectively on such rejection of article purchase selection for effecting substitution of the output signal generated by said sensing means for the stored characteristic signal, said processor means being further responsive to the receipt of said rejection means output rejection-indicative signal to enable operation of said override means and, upon operation thereof, to convey said sensing means output signal to said storage means.

5. The invention claimed in claim 4 wherein said sensing means generates said output signals thereof as indicative of article size.

6. The invention claimed in claim 4 wherein said sensing means generates said output signals thereof as indicative of article weight.

* * * * *